March 11, 1924.
H. J. MURRAY
AGRICULTURAL PRECISION DEVICE
Original Filed June 21, 1919   4 Sheets-Sheet 3
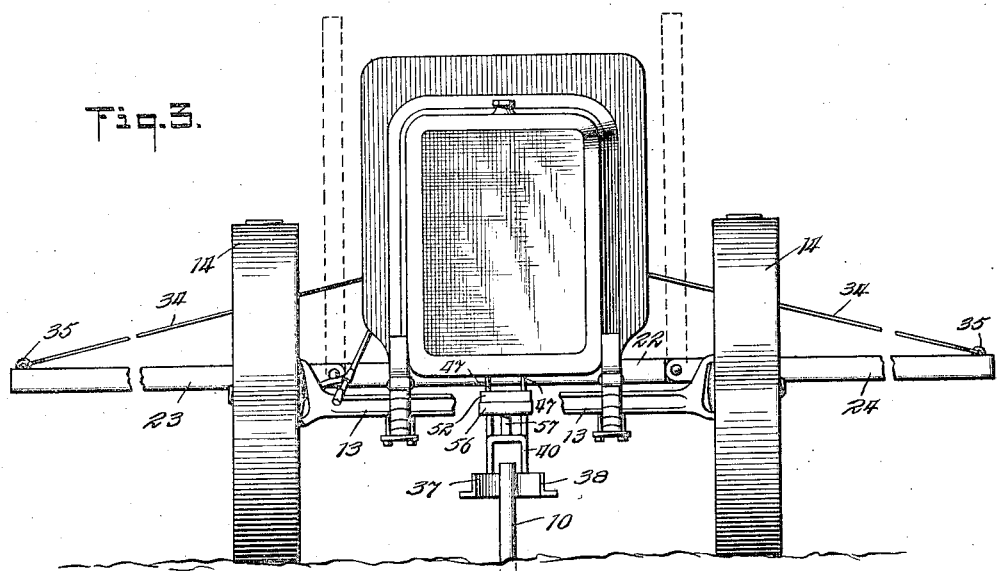
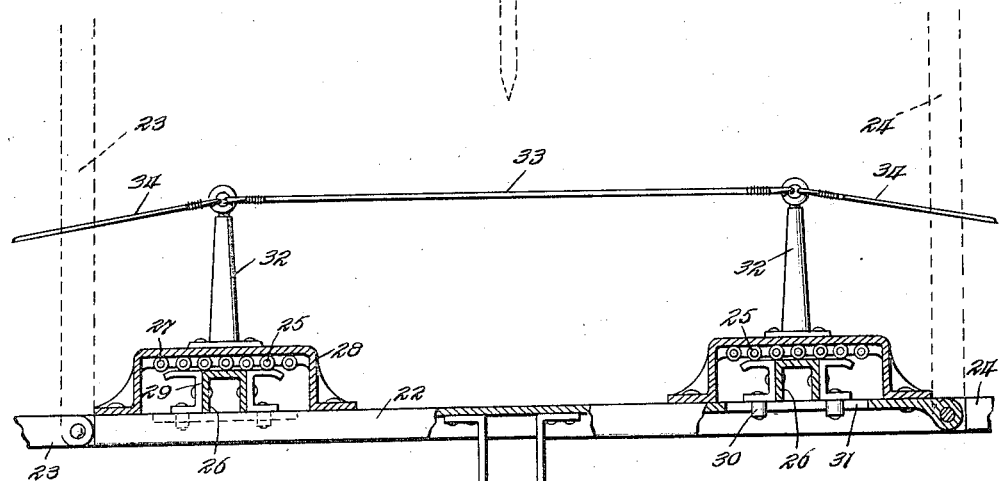

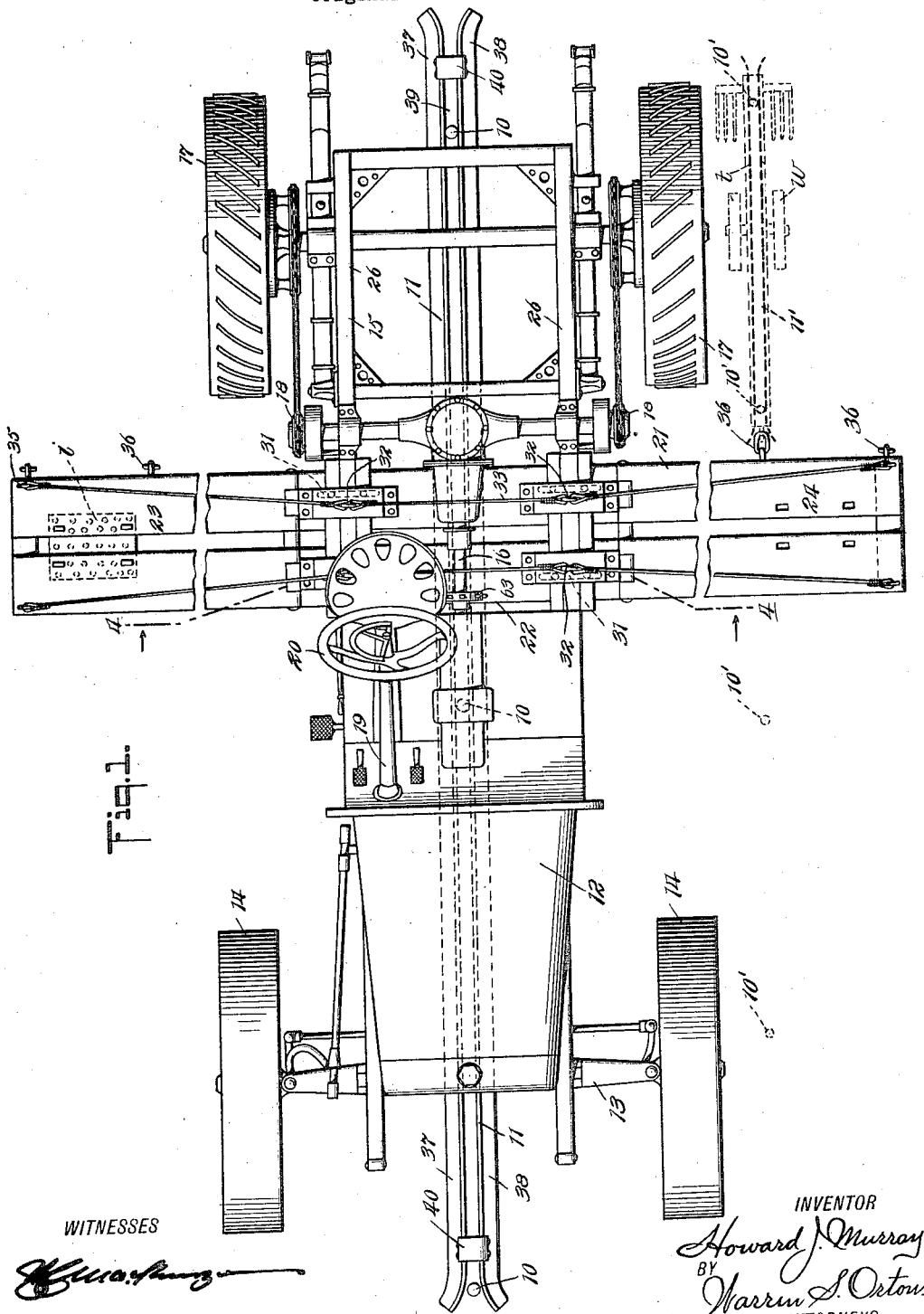

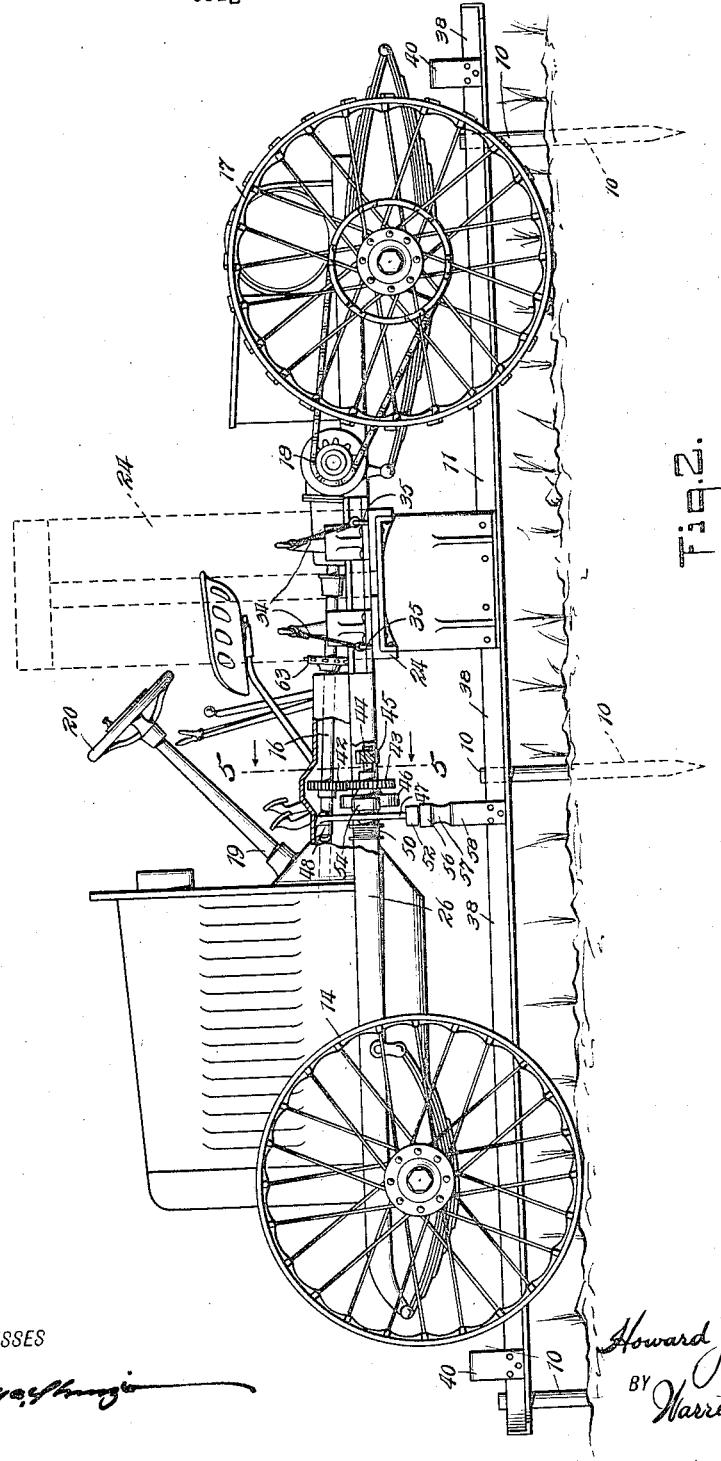

March 11, 1924.

H. J. MURRAY

AGRICULTURAL PRECISION DEVICE

Original Filed June 21, 1919  4 Sheets-Sheet 4

1,486,355

WITNESSES

INVENTOR
Howard J. Murray
BY
Warren S. Orton
ATTORNEYS

Patented Mar. 11, 1924.

1,486,355

UNITED STATES PATENT OFFICE.

HOWARD J. MURRAY, OF BROOKLYN, NEW YORK.

AGRICULTURAL PRECISION DEVICE.

Application filed June 21, 1919, Serial No. 305,940. Renewed August 4, 1923.

*To all whom it may concern:*

Be it known that I, HOWARD J. MURRAY, a citizen of the United States, and resident of the borough of Brooklyn, county of Kings, and State of New York, have invented certain new and useful Improvements in Agricultural Precision Devices, of which the following is a specification.

The invention relates to an agricultural system or method of raising vegetation of any character and also relates to instrumentalities for effectively and economically practicing the method.

It is appreciated that agricultural land, when subjected to methods of planting now in vogue in practicing intensive farming does not give its maximum possible yield of vegetation, due among other causes to the fact that the growing plants are not economically disposed relative to each other to obtain the greatest possible number of healthy plants per unit area of field under cultivation.

Attempts have been made to obtain this maximum growth but in such cases the planting either has to be spaced sufficient to permit access to the growing plants for the purpose of cultivation or other treatment or, in the case of close planting, the treatment has to be neglected, thus resulting in a poor yield from each individual plant. This unsatisfactory condition was due to the high cost of manual cultivation and in similar labor and to the difficulty of controlling mechanical cultivating devices in the limited space between the growing plants and this difficulty was enhanced in those situations where the spacing of the plants was irregular or where the character of the ground imposed difficulties.

Another disadvantage inherent in the present mode of treating growing plants, is that the supplying of water, fertilizing or other material is wasteful; in that the whole tract has to be watered or covered with fertilizer with the hope that some of the substances supplied will eventually reach the plants.

The primary object of the invention therefore is to provide for a method of farming in which the several operations incidental to the planting and raising of any particular substance will be performed with precision and accuracy in its desired relation to preceding and to succeeding operations and which accurate treating of the ground and plants will be substantially independent of the character of the ground and of the density of the growing vegetation.

Discussed in further detail, the invention contemplates the providing of an agricultural machine of the tractor type and a particular method of using the same, by means of which the seeds, plants, bulbs, or similar members may be planted in a definite and determinable relation to each other and by means of which succeeding operations, such as cultivating the ground between adjacent plants and supplying fertilizer, water or other substances to the plant, may be accurately controlled so that the different operations incidental to cultivating a field may be repeated in any desired sequence and in accurately controlled preset relation to every other operation. For instance, in the case of cultivating it is proposed to break up the ground practically up to each individual plant and in the case of supplying material to the plant to confine the distribution automatically to the part of the previously located plant where it will be mostly benefited.

It has been suggested to lay tracks, more or less permanently, across the tillable ground and to mount the agricultural implements on carriages or bridges supported from these tracks. The cost of installing any such cumbersome system is commercially prohibitive and in other cases is impractical from an engineering standpoint.

One of the primary objects of the invention therefor is to provide a device of the character outlined which will cause any of the usual agricultural tools to traverse a definite and accurately defined path without the necessity of a substantial guide therefor, such as the track constructions hereinbefore suggested.

Broadly, I attain this object first by staking off the field with a series of spaced apart posts and monuments arranged to permit the growing of the vegetation between adjacent posts and thus economize in the space appropriated for this purpose. One or a plurality of agricultural implements or a tractor therefor, are provided with a guide of a length sufficient at all times to engage two of these posts, and are then caused to traverse the field while performing their particular function. For instance, an automatic seed planter could be guided across the field by means of the posts to locate accurately the position of the plants to be grown from the seeds thus positioned and this operation could be followed later by a cultivator accurately guided to cultivate the space between the growing plants.

Particularly referring to the mechanical feature of the invention another object is to provide a simple form of vehicle, preferable to the self-propelled type, which will hold an agricultural tool to a given loci and independent of any displacing action which might otherwise be imposed thereon by the irregular surface of the ground reacting on the ground engaging wheels supporting the vehicle structure.

Another object of the invention is to provide a device of the type disclosed which will possess all of the advantages of an automobile type of vehicle, such as a manual control for guiding the same in any desired direction, so as to be transported readily from place to place and which, when in engagement with the monuments hereinbefore suggested, will be guided automatically over any predetermined path and without the necessity for a manual control.

Still another object of the invention is to provide a simple form of vehicle of the class described which will itself supply all the necessary power to drive the same, to steer the same in its automatic action and which will supply the power necessary to actuate any tools carried or propelled thereby.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:—

Figure 1 is a plan view of a tractor illustrating a preferred embodiment of the mechanical features of the invention; and showing in dotted outline a diagrammatic representation of an agricultural tool drawn thereby;

Figure 2 is a view in side elevation of the device shown in Figure 1 with the tool omitted, with the slidable tool platform shown in operative position in full lines and shown in its raised, inoperative position in dotted lines;

Figure 3 is a view in front elevation of the device shown in Figure 2;

Figure 4 is an enlarged transverse sectional view taken on the broken line 4—4 of Figure 1, looking in the direction indicated by the arrow;

In the following description and in the claims, parts will be identified by specific names for convenience of expression but they are intended to be as generic in their application to similar parts as the art will permit.

Figure 6:
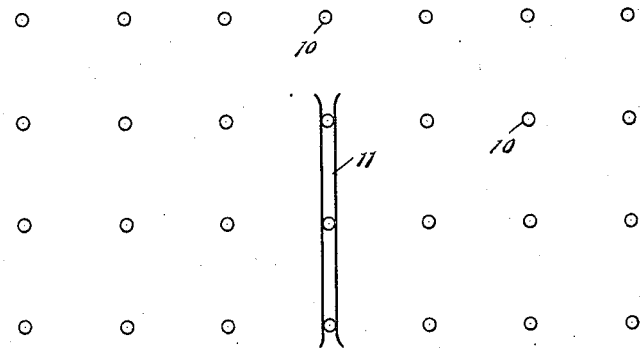
Figure 6 represents diagrammatically and in plan a field or garden spaced off by posts or monuments and indicating the engagement therewith of the guides shown attached to the vehicle in the preceding figures.

Referring first to the disclosure in Figure 6, posts or monuments 10 are positioned in the ground and in spaced apart relation, preferably in a series of straight parallel lines. It is to be understood, however, that the invention is of sufficient breadth to include the situation where the posts are otherwise disposed and as a matter of fact the disposition of the posts will depend largely upon the topography of the ground and of the character of the vehicle which is to be guided by these posts. The posts do not have to be spaced apart equal distances, as illustrated, but must be spaced apart a distance less than an arbitrarily selected distance, herein identified, as a unit distance, marked u. d. in Figure 6. This unit distance is limited by the length of guides 11 on the machine, hereinafter described, as is so proportioned that at least two of these posts will be contained within the guides at all times.

For the purpose of showing that the device may be moved in two directions at right angles to each other, the posts in Figure 6 are arranged in equally spaced apart positions in intersecting lines.

One of the features of this disclosure is that the posts do not necessarily have to be securely positioned in place. In some agricultural situations it is necessary to have a light loose soil which obviously is not capable of supporting posts or monuments which must be rigidly positioned. As the posts in this disclosure do not have to support any weight imposed thereon and do not have to withstand any material side thrust, it is necessary merely that they be held in preset position and capable of withstanding the relatively light resistance to lateral movement imposed thereon by the guides, as the device traverses the field.

Referring to the vehicle, shown in the other figures, there is disclosed a tractor 12 which is intentionally made as close as possible to conventional forms of such devices to feature the utilization of standard structures. There is shown in general certain unsprung parts including axles 13 and ground engaging wheels 14 collectively referred to hereinafter as running gears. The vehicle also includes certain spring supported members, such as the frame or chassis 15 for supporting the parts carried by the vehicle. The chassis supports a power plant indicated symbolically by the main driving shaft 16 which is operatively connected to the rear tractor wheels 17 through the usual differential and chain drive 18 to propel the vehicle as is well known in devices of this character. The vehicle also includes a conventional form of steering mechanism indicated symbolically by the steering column 19 in Figure 5 controlled by the steering wheel 20. The vehicle may thus be guided manually as is known in approved forms of automobile tractor constructions.

A tool platform 21 is mounted on the chassis for a limited lateral movement relative thereto in both directions from its normal centered position shown in Figure 4. The platform includes a central portion 22 extending slightly beyond the sides of the chassis and two outstanding wing portions 23 and 24 pivoted to the outer ends thereof and designed, when the device is not in active operation, to be folded up out of the way as shown in dotted lines in Figures 2 and 3. For the purpose of suspending the platform from the chassis and at the same time minimize frictional resistance to relative movement between the chassis and the platform, anti-friction devices 25 are positioned between the central member 22 and each of the side sills 26 of the chassis.

Referring to Figure 4 for a more detailed description of this connection it is noted that the anti-friction device is in the form of rollers 27 mounted within a housing 28 extending upwardly from the member 22 with the rollers positioned to slide over the side sills and to slide over brackets 29 fixed to opposite sides of the sills. The upper faces of these brackets constitute extensions of the upper face of the sills so as to provide for the necessary side play between the chassis and rollers. The platform 21 is held against movement in a direction longitudinally of the vehicle by means of upstanding rollers 30 which depend from the underside of the brackets 29 and engage in slots 31 formed in the member 22. These slidable connections between the platform 21 and the chassis is preferably arranged in pairs on opposite sides of the longitudinal medial line of the machine as shown more particularly in Figure 1. The wings 23 and 24 constitute, in effect, a pair of cantilever constructions and for the purpose of bracing these constructions and at the same time minimizing the weight of any necessary structural parts, pairs of posts 32 are positioned to extend upwardly from each of the housings 28.

A pair of transversely disposed bracing members 33 connect the posts across the central section 22 and flexible bracing members 34 extend from each of the posts outwardly to connect with eyes 35 positioned adjacent the outer corners of each of the wings 23 and 24. The purpose of this construction is to provide the lightest possible form of slidable tool platform and at the same time provide a structure for supporting and drawing the tools hereinafter defined, free of any tendency to displace the tools from their desired path of movement due to flexure of the tool platform.

This platform is designed to support any of the agricultural implements now known, such as automatic seed planters, water, chemical and plant food distributing devices, rakes, harvesting devices and the like, one of which is shown in dotted outline at $i$ in Figure 1 fixed rigidly to the platform. It is obvious that by suitable modifications of the device disclosed, it can be adopted to support any of the agricultural or other implements which it is desired to carry across a field or other stretch of land. It is further obvious that agricultural implements of the type which engage or are supported by the ground may be pushed or drawn by the device herein disclosed, provided of course they are rigidly attached to the platform or separately engage the guiding posts. In order to illustrate the adaptability of the machine for use in connection with such tools, attaching rings 36 are shown positioned on the rear edge of the platform 21 and in Figure 1 a self-guiding tool, $t$, provided with supporting wheels, $w$, is shown in dotted outline. This disposition of the attaching rings will also suggest that a plurality of ground engaging machines, such as a train of harrows may extend rearwardly of the platform, on opposite sides and between the tractor wheels 17.

The guide 11 is formed of two parallel guide bars in the form of angle irons 37 and 38 positioned below the chassis and on opposite sides of the longitudinal medial plane of the vehicle. These bars are spaced apart to form a guideway 39 therebetween having a width slightly greater than the width of the posts 10, as shown in Figure 4. These bars are positioned as close to the ground as is physically possible taking into consideration the necessity for clearing tree stumps and other low objects and for permitting the vehicle to move independently of irregularities of the ground. The bars are coupled together by spaced apart U-shaped loops 40 and at their centers are rigidly affixed to and depend from the member 22 by means of relatively long and strongly braced hanging plates 41.

Figure 5:
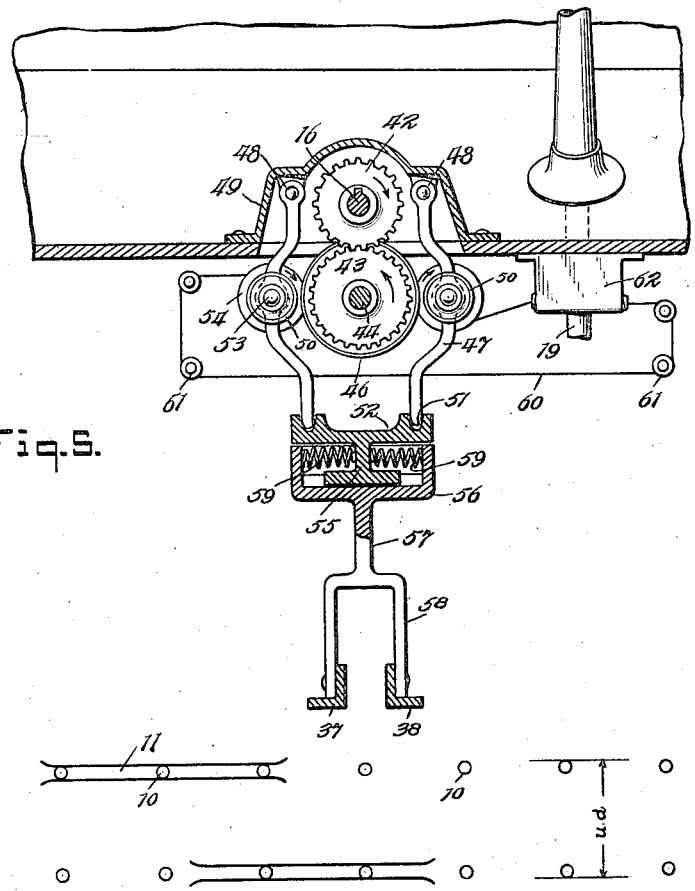
Figure 5 is an enlarged transverse vertical sectional view taken on the line 5—5 of Figure 2, looking in the direction indicated by the arrow.

Referring particularly to the disclosure in Figure 5 it will be seen that the guide bars are operatively connected to the steering mechanism so that the movement of the guideway in either horizontal direction under the influence of the posts engaged thereby will automatically cause the vehicle proper to move in the direction defined by the series of posts. There is also featured in this disclosure a preferred construction for actuating the steering mechanism from a source of power carried by the vehicle, thereby to release the posts of the strain which would otherwise be imposed thereon if the reaction between the vehicle and post had to supply the power necessary to actuate the steering mechanism. In this disclosure the power is conveniently supplied by the vehicle propelling plant represented by the shaft 16. A gear 42 is fixed to the shaft 16 and meshes through any desired speed reduction with a second gear 43 mounted on a supplemental shaft 44 journalled in bearings 45 carried by the chassis. This supplemental shaft carries a relatively large friction drive disk 46 in continuous rotation. Positioned on opposite sides of the disk are a pair of pendulous arms 47 pivotally mounted at their upper ends on pins 48 carried by a casing 49 which casing is in turn supported from the chassis as shown in Figure 2. Each of the arms 47 carries a relatively small friction disk 50 for engaging opposite sides of the disk 46 to receive motion therefrom. The free lower ends 51 of the arms are positioned in spaced apart relation in a transversely sliding block 52. The block so positions the free ends that normally both of the driven disks 50 are out of engagement with the continuously driving disk 46 as shown more particularly in Figure 5. The disks 50 are each mounted upon a shaft 53 carried by its corelated arm and each of the shafts 53 is provided with a winding drum 54.

The block 52 is provided centrally thereof with a depending, inverted T-shaped guiding member 55 mounted for sliding movement transversely in a housing 56. This housing constitutes the upper end of a yoke member 57, the lower bifurcated ends 58 of which are rigidly fastened to each of the guide bars 37 and 38. The member 55 is centered in the casing 56 by means of a pair of oppositely disposed springs 59 which normally act thereon to maintain the same centered within the casing and with the driven disks 50 idle. A flexible connection 60 has opposite ends passed about the drums 54, is trained about positioning pulleys 61 and is operatively connected to the steering column 19 by any conventional type of mechanism positioned within the box 62 and so arranged that the movement of the connection 60 in one direction will steer the mechanism in one direction and conversely the movement of the connection in the opposite direction will correspondingly effect the direction of movement of the vehicle.

For the purpose of showing that the power plant carried by the vehicle may be utilized to drive the movable elements of the tools supported by or drawn by the vehicle, a sprocket wheel 63 is fixed to the shaft 16. It is understood that the different tools constitute accessories and are provided with the necessary connections, such as a chain drive for engaging the sprocket wheel, for coacting with the vehicle in performing their respective functions.

In operation and assuming that the vehicle disclosed is properly equipped with the particular tool with which it is desired to coact and assuming that the ground has been properly staked off as hereinbefore suggested, the vehicle can be moved under its own power and steered to the field where it is desired to be employed. The operator cautiously positions the machine so as to point in the direction in which it is desired to proceed and in engagement with at least two of the posts. The operator can then abandon the steering mechanism and can proceed to operate the tools, if the personal attention of the operator is necessary with the particular tool in use. The vehicle will move in the direction defined by the line of posts and will carry or trail the tools along lines parallel to the mean line of movement of the vehicle. It will be understood that any vertical movement of the ground engaging wheel will have little, if any, effect on the tool platform, due to the loose connection between the platform and chassis and, of course, due to the loose connection provided by the springs between the running gear and the chassis. Any tendency of the vehicle to move to the right or left of its preset path of movement defined by the posts will cause one or the other of the guide rails to lightly engage the side of the posts in engagement therewith. As the guide, rollers and the parts associated therewith are of light construction, the strain on the side of the post will be relatively small but will be sufficient to cause a lateral shifting of the guide relative to the chassis. This movement of the guide will react through the member 57 and against the resistance of the relatively weak springs 59 to move one or the other of the driven disks 50 into engagement with the power driven disk 46. This will automatically couple the power mechanism carried by the vehicle to the steering mechanism and will thus act to restore the steering wheels in that position in which the guiding posts will be relieved of any pressing action on the sides of the same. Should the vehicle tend to move in the opposite direction, the corresponding movement will be inaugurated to rectify the tendency of the machine to go in that direction. Accordingly the machine will be caused to travel along its preset path defined by the position of the posts and the lateral movements of the vehicle can be reduced to a negligible amount by a careful positioning of the posts, by an accurate fitting of the posts in the guides and by a sensitive connection between the guides and the steering mechanism. When the machine has reached the end of its movement in one direction, it may be turned about by the manual actuation of the steering mechanism so as to engage the next line of posts, or the posts may be arranged in a continuous line so as to swing the vehicle automatically back into engagement with another line of posts. It is quite obvious that the machine may be equipped with mechanism for driving a line of posts to control its return movement across the field.

Under some conditions, for instance, where it is desired to cultivate the ground on all sides of each growing plant, the device, equipped with the proper types of tools, may be run repeatedly in one direction and as close to each plant as is possible with the tool employed, and then by causing the machine to traverse the field in engagement with the same posts and at right angles to the previous line of movement, the ground can be worked as close as is possible up to the sides of the plants at right angles to the previously worked sides. In this way it is possible to work the ground close up to the plants on four sides thereof as suggested in the diagrammatic showing in Figure 6. Should the particular forms of tools drawn by the vehicle supported on the platform table require the application of power to its working parts, this power may be conveniently obtained from the power plant carried by the vehicle through a suitable connection with the socket member 63.

By means of a device of this character, it is possible to cause the tools to traverse the field in a straight, or other predetermined line and without the necessity of using tracks or other cumbersome and expensive guiding structures. As a matter of fact the device can be utilized on a type of ground which would not permit the installation of tracks and there is also effected a saving in space which would otherwise be taken up by the tracks.

By this construction the applied tools are held to a given loci but the necessity of providing for weight, side thrusts and horizontal components in the same given loci is eliminated and therefore the necessity for substantial guides is eliminated.

The tools are either supported directly from the ground as shown in dotted outline in Figure 1 or are supported by the vehicle with some freedom to move relative thereto thus insuring the maintenance of the tools in their desired path of movements and uninfluenced by their massiveness.

It is suggested that the vehicle illustrated may be used as a tractor to draw certain forms of self-guiding tilling devices with it across the field. In this way a series of succeeding operations may be performed upon the ground or on the growing plants with but one transitory movement of the apparatus.

Where conditions permit it is preferable that the posts remain in position so as to act as monuments in succeeding planting seasons to indicate the location of the previous plantings. In such cases it is of course desirable that the monument be more permanently fixed in position than has been herein suggested and this would usually be most readily attained by utilizing posts of greater length and of greater durability than would be necessary where the stakes were changed from time to time.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In the art of mechanical agriculture where it is desired to direct an agricultural vehicle provided with a self-guiding device having a definite length over the ground and along a preset path, the process which includes the step of staking off the ground with a series of spaced apart posts adapted to be engaged by said guiding device automatically to guide the vehicle, positioning the posts in such a direction relative to each other that an imaginery line connecting said posts in order will indicate substantially the path which it is desired that the vehicle should traverse in its movement along the ground, said posts being spaced apart a distance less than said definite length of the vehicle guiding device.

2. In the art of mechanical agriculture, the process which includes the step of positioning a series of monuments in position in the ground and disposing the same to project about the same thereby to form guiding means for directing the movement of an agricultural implement when moved across the ground and in engagement with said monuments, said monuments being spaced apart from each other to permit the growth of vegetation therebetween.

3. In the art of mechanical agriculture, the process which includes the step of positioning a series of monuments in position in the ground and disposing the same to project about the same thereby to form guiding means for directing the movement of an agricultural implement when moved across the ground and in engagement with said monuments, said monuments being spaced apart from each other to permit the growth of vegetation therebetween and causing an agricultural implement to move in operative engagement with the monuments so disposed.

4. In the agricultural art, the process which includes the step of disposing a plurality of agricultural vehicle guiding posts in position in the ground to be worked and in spaced apart relation in substantially parallel rows, the posts being positioned apart in the rows and the rows spaced apart a distance to permit the growth of vegetation between each post and the adjacent posts in all directions.

5. In a device of the class described, the combination with a line of monuments, in which each monument is spaced apart a distance sufficiently great to permit the growth of vegetation therebetween and spaced apart in order a distance less than an arbitrary unit distance, of a vehicle provided with a monument-engaging-guide having an operative length not less than said unit distance whereby the vehicle at all times will be in engagement with at least two of said monuments as it moves along said line of movements.

6. In a device of the class described, the combination with a line of spaced apart posts projecting above the ground and disposed to permit the growth of vegetation therebetween, of a vehicle provided with a pair of longitudinally extending guiding members adapted to be disposed on opposite sides of said line of posts in position to engage the posts and thus guide the vehicle along said line.

7. In a device of the class described, the combination with a line of spaced apart posts projecting above the ground and disposed to permit the growth of vegetation therebetween, of a vehicle provided with a pair of longitudinally extending guiding members adapted to be disposed on opposite sides of said line of posts in position to engage the posts and thus guide the vehicle along said line, said guiding members having a length sufficient to engage simultaneously at least two of said guides.

8. In a device of the class described, the combination with a series of spaced apart posts adapted to be set in the ground in a prescribed relation and each provided with a vehicle-guiding-part, of a vehicle supported directly from the ground and provided with a guideway adapted to receive said guiding parts of the posts as the vehicle is moved along the same thereby to guide the vehicle.

9. In an agricultural device, the combination with a series of spaced apart posts set in the ground to be worked and each provided with a vehicle-guiding-part, of a vehicle provided with ground engaging wheels and a guideway adapted to receive said guiding parts of the posts as the vehicle is moved along the same thereby to guide the vehicle and means carried by the vehicle for minimizing any tendency of the vehicle to exert lateral strains on the posts.

10. A vehicle including a running gear, a relatively heavy structural part supported from said running gear, a relatively light guideway loosely mounted on said relatively heavy part extending longitudinally of the vehicle and adapted to engage a series of posts projecting from the ground as the vehicle is moved, said running gear and heavy part having a slight freedom of movement relative to the light post engaging guideway whereby movements originating in said heavy parts are prevented from passing to the posts until the permissible freedom of movement between the guideway and the heavy structural parts has been exceeded.

11. A vehicle including a running gear, a relatively heavy structural part supported from said running gear, a relatively light guideway loosely mounted on said relatively heavy part extending longitudinally of the vehicle and adapted to engage a series of posts projecting from the ground as the vehicle is moved, said running gear and heavy part having a slight freedom of movement relative to the light post engaging guideway whereby movements originating in said heavy parts are prevented from passing to the posts until the permissible freedom of movement between the guideway and the heavy structural parts has been exceeded, said vehicle having steering mechanism operatively connected to said guideway to steer the vehicle along a path determined by said posts.

12. A vehicle including a running gear, a steering mechanism therefor, a chassis supported from said gear, a guideway carried by the chassis, capable of slight horizontal movement relative thereto and adapted to engage a line of posts projecting from the ground and a connection between said guideway and said steering mechanism for restoring said running gear to normal position relative to said chassis when displaced therefrom.

13. A vehicle including a running gear, a power plant carried thereby and operatively connected to the running gear to drive the vehicle, a steering mechanism for guiding the movement of the vehicle, said steering mechanism being operatively connected to the power plant whereby the power for actuating the vehicle steering mechanism is supplied by the power plant which drives the vehicle.

14. A vehicle including a power supplying element, mechanism for steering the vehicle, a control adapted to engage a monument on the ground and actuated thereby, the movement of said control in one direction relative to the vehicle acting to couple said power element to the steering mechanism whereby the power for actuating the steering mechanism is supplied from the power element carried by the vehicle.

15. A vehicle provided with steering mechanism and including a power supplying element adapted to be in continuous action while the vehicle is moving, a normally inactive driven element operatively connected to the steering mechanism to actuate the same, a guide carried by the vehicle and adapted to contact with controlling objects external to the vehicle and a connection between said guide and said driven element to move the driven element into engagement with the power supplying element thereby to actuate the steering mechanisms.

16. A vehicle provided with steering mechanism and including a power supplying element adapted to be in continuous action while the vehicle is moving, a normally inactive driven element operatively connected to the steering mechanism to actuate the same, a guide carried by the vehicle and adapted to contact with controlling objects external to the vehicle and a connection between said guide and said driven element to move the driven element into engagement with the power supplying element thereby to actuate the steering mechanisms and means normally tending to restore the driven member to its inactive position free of the power supplying element.

17. A vehicle including a running gear, a power plant carried thereby and operatively connected to the running gear to drive the vehicle, a steering mechanism for guiding the vehicle, a manual control for said steering mechanism whereby the vehicle may be guided at will in any desired direction, a guide carried by the vehicle and adapted to engage monuments on the ground, and means operatively connecting the guide with the steering mechanisms whereby the vehicle may be guided automatically to travel along a preset path defined by the monuments.

18. A vehicle including a running gear, a power plant carried thereby and operatively connected to the running gear to drive the vehicle, a steering mechanism for giuding the vehicle, a manual control for said steering mechanism whereby the vehicle may be guided at will in any desired direction a guide carried by the vehicle and adapted to engage monuments on the ground, means operatively connecting the guide with the steering mechanisms whereby the vehicle may be guided automatically to travel along a preset path defined by the monuments, the ground engaging wheels of said running gear being offset laterally from said guide whereby the wheels can travel along the ground without contacting with the guiding monuments.

19. In an organization of the class described, the combination of a series of spaced apart posts which do not necessarily have to be securely positioned in the ground, said posts designed to be free of any weight imposed thereon, an agricultural implement provided with a ground engaging wheel for supporting the same directly from the ground and independent of said posts, means carried by the implement for guiding the vehicle, said means including a guide adapted to engage the side of the posts lightly as the implement is moved along the posts, said guide being sensitively responsive to forces imposed thereon by the lateral shifting of the guide into pressing engagement with the sides of the posts whereby the implement may be guided by posts which may be held only loosely in place.

20. In an organization of the class described, the combination of a series of spaced apart posts which do not necessarily have to be securely positioned in the ground, said posts designed to be free of any weight imposed thereon, an agricultural implement provided with a ground engaging wheel for supporting the same directly from the ground and independent of said posts, means carried by the implement for guiding the vehicle, said means including a pair of longitudinally extending guide bars spaced apart a distance slightly greater than the posts received therebetween, said guide being sensitively responsive to forces imposed thereon by the lateral shifting of the guide bars into pressing engagement with the sides of the posts whereby the implement may be guided by posts which may be held only loosely in place.

21. In a self-propelled agricultural device, the combination of a running gear, a power plant for driving the same, a steering mechanism for guiding the device manually, and automatically actuated guiding mechanism including control means adapted to be affected by objects external to the device and operatively connected to the steering mechanism for controlling the direction of movement of said device.

22. In a device of the class described, the combination of a trackless self-propelled agricultural device provided with ground engaging wheels for supporting the weight of the same directly from the ground and for propelling the same, and longitudinally spaced apart guideways spaced from said wheels disposed in alignment lengthwise of the vehicle, between the wheels and operatively associated with said device for causing the same to move along a preset path.

23. In a device of the class described, the combination of a trackless self-propelled agricultural device, provided with ground engaging wheels for supporting the weight of the same directly from the ground, continual means spaced apart in the ground for steering the same and means spaced from said wheels and operatively associated with said steering means for causing the device to move along a preset path.

24. In a device of the class described, the combination of a vehicle having ground-engaging wheels for supporting the same, a ground engaging tool drawn by said vehicle, means for causing the tool to traverse a predetermined line offset from said wheels and a flexible connection between said vehicle and said tool for permitting slight variations of movement of said wheels from their paths of travel parallel to said predetermined line without affecting the direction of movement of said tool.

25. In a device of the class described, the combination of a vehicle provided with a power plant for driving the same, a steering device for guiding the same, means operatively connected to the steering device and adapted to engage a series of monuments for causing the vehicle and the parts attached thereto to move along a preset path, said vehicle provided with means for attaching an agricultural tool thereto thus causing the vehicle to act as a tractor and means constituting part of the power plant and adapted to be connected to a movable element of the tool whereby the attached tool may be actuated from the vehicle power plant as it is drawn along by the vehicle.

26. In an agricultural device, the combination of a vehicle having ground engaging wheels for supporting the same and providing traction wheels for propelling the vehicle, means for steering the vehicle, a ground engaging tool platform supported by the vehicle, a tool supported by the platform and a guide operatively associated with the platform to maintain the tool in a preset line as the vehicle is moved forwardly.

27. In a device of the class described, the combination of a vehicle having ground engaging wheels for supporting the same, a tool platform supported by the vehicle, a tool supported by the platform and a guide operatively associated with the platform to maintain the tool in a preset line as the vehicle is moved forwardly and capable of relative movement between the vehicle and tool, a guide operatively associated with the tool and tending during the movement of the vehicle to maintain the tool in a definite loci independent of slight deviations of the ground engaging wheel from said definite loci.

28. In a device of the class described, the combination with a line of posts, a tool, guiding means for maintaining said tool in preset relation to the line of posts, and a tractor loosely connected to said tool to cause the same to move in said preset relation independent of slight deviations of said tractor from its line of movement parallel to said line of posts.

29. In a device of the class described, the combination of an agricultural tool, means adapted to engage spaced apart stakes in the ground for guiding said tool in a preset direction defined by said stakes, and draft means supported directly from the ground for moving said tool while so guided.

30. In a device of the class described, the combination of an agricultural tool, means for guiding said tool in a preset direction, and draft means supported directly from the ground for moving said tool while so guided and steering means operatively responsive to said guiding means for directing the direction of movement of said draft means.

31. In a device of the class described, the combination of a chassis provided with a running gear and steering mechanism therefor, a tool slidably mounted for transverse movement on said chassis, a guide rigidly attached to said tool and adapted to engage a series of posts in the ground, means for limiting the movement of the tool relative to the chassis and means reacting between the tool and chassis for actuating the steering mechanism.

32. In a device of the class described, the combination of a chassis provided with a running gear and a steering mechanism therefor, a platform including a central portion supported by the chassis and an outstanding cantilever wing supported from the central portion and adapted to be moved into an inoperative position, a pair of guide rods fixed rigidly to the central portion, extending longitudinally beneath the chassis and adapted to receive a line of posts as the vehicle is moved along said line thereby to guide the outstanding wing.

33. In a device of the class described, the combination of a chassis provided with a running gear and a steering mechanism therefor, a platform including a central portion supported by the chassis and an outstanding cantilever wing supported from the central portion and adapted to be moved into an inoperative position, a pair of guide rods fixed rigidly to the central portion, extending longitudinally beneath the chassis and adapted to receive a line of posts as the vehicle is moved along said line thereby to guide the outstanding wing and means connecting the guide rods with the steering mechanism to guide the vehicle and thus keep it substantially in fixed relation to the platform.

34. In a device of the class described, the combination of a chassis provided with a power plant for driving the same, and a steering mechanism, of an attachment including a tool support carried by said chassis, a ground working tool carried by the tool support, a guide operatively connected to said support to control the position thereof relative to the ground, and means controlled by said guide and connected to said steering mechanism for automatically guiding the vehicle.

35. In a device of the class described, the combination of a chassis provided with a power plant for driving the same, and a steering mechanism, of an attachment including a tool support carried by said chassis, a ground working tool carried by the tool support, a guide operatively connected to said support to control the position thereof relative to the ground, and means controlled by said guide for connecting said power plant to the steering mechanism thereby to guide the vehicle by its self contained power.

Signed at New York city, in the county of New York and State of New York, this 18th day of June, A. D. 1919.

HOWARD J. MURRAY.